United States Patent
Kennicutt et al.

[11] 3,779,615
[45] Dec. 18, 1973

[54] MOUNTING DEVICE FOR ROTATABLE MEMBERS

[75] Inventors: Robert B. Kennicutt, Morton; Ellis A. Sitton, East Peoria; John W. Yancey, Aurora, all of Ill.

[73] Assignee: Catepillar Tractor Company, Peoria, Ill.

[22] Filed: Apr. 10, 1972

[21] Appl. No.: 242,701

[52] U.S. Cl. ................................ 305/31, 305/10
[51] Int. Cl. ...................... B62d 55/12, B62d 55/30
[58] Field of Search .................. 305/10, 30, 31, 32

[56] References Cited
UNITED STATES PATENTS

| | | | |
|---|---|---|---|
| 1,594,887 | 8/1926 | Leake | 305/32 |
| 2,683,064 | 7/1954 | Land | 305/10 |
| 2,887,342 | 5/1959 | Helsel | 305/10 |
| 2,959,451 | 11/1960 | Weber | 305/10 |
| 3,382,013 | 5/1968 | Toth | 305/30 |

FOREIGN PATENTS OR APPLICATIONS 1,086,008  12/1964  Great Britain ...................... 305/10

Primary Examiner—Richard J. Johnson
Assistant Examiner—Reinhard J. Eisenzopf
Attorney—Freling E. Baker et al.

[57] ABSTRACT

A mounting assembly for slidably supporting a rotatable member comprises a shaft supporting the rotatable member by means of a pair of support brackets being disposed between a pair of substantially parallel frames with each support bracket having a pair of outwardly extending projections slidably embracing a pair of mounting surfaces provided on each frame.

9 Claims, 6 Drawing Figures

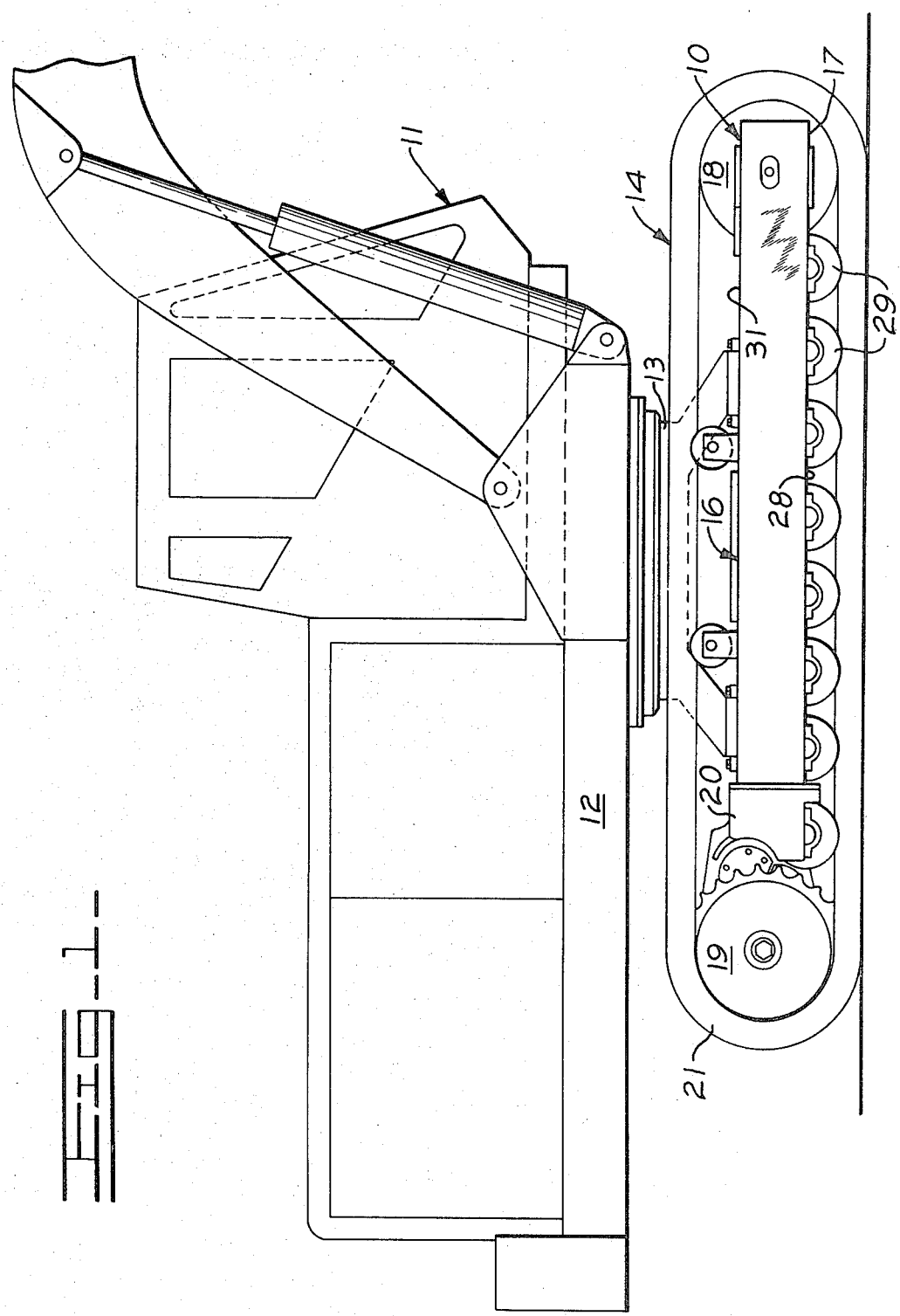

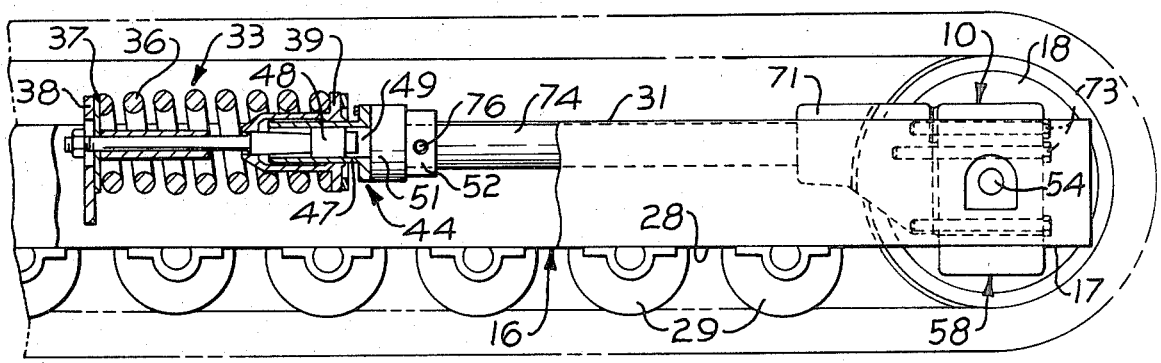
Fig-2-
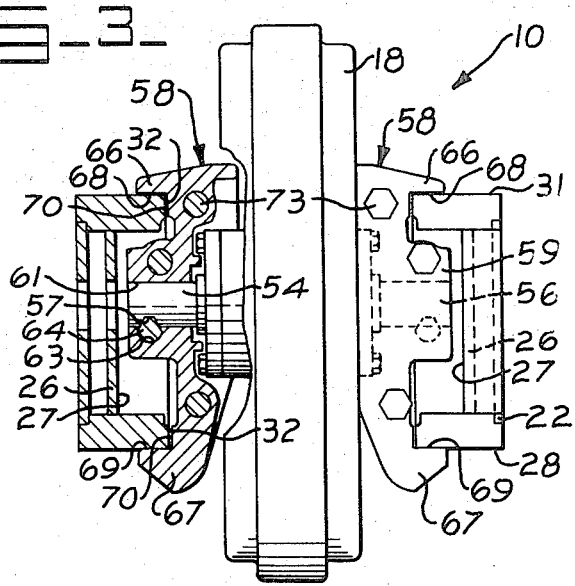
Fig-3-

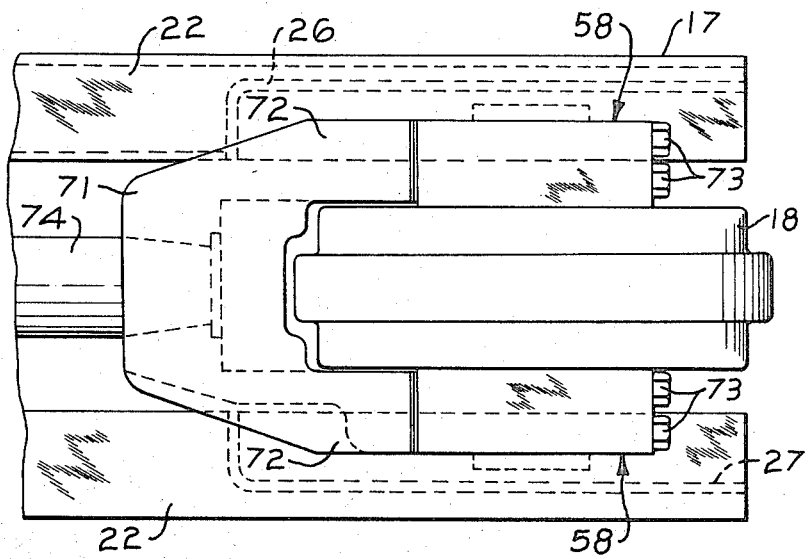
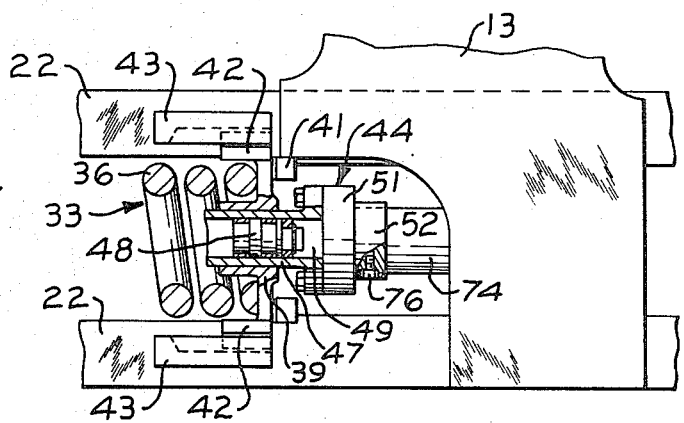
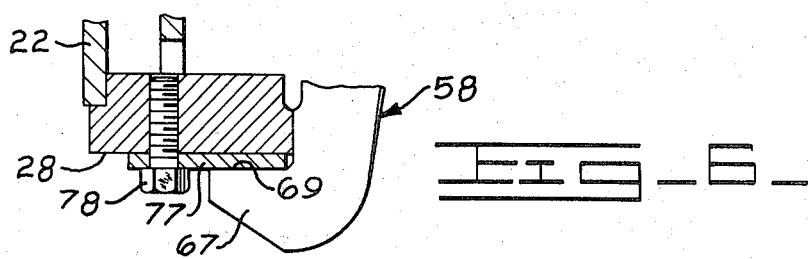

MOUNTING DEVICE FOR ROTATABLE MEMBERS

BACKGROUND OF THE INVENTION

Track-type tractors have a pair of track assemblies arranged on opposite sides thereof with each track assembly usually including a track roller frame including a pair of elongated spaced substantially parallel rails. A track support idler is slidably mounted on the front end of the frame between the rails for track adjusting and recoil purposes. The idler is rotatably mounted on a shaft, which is usually supported above the rails by means of a pair of brackets slidably fitted to their respective adjacent rails. The brackets are connected to a recoil mechanism to permit the idler to move rearwardly to prevent damage to the track when objects become lodged between the track and the idler and/or track drive sprocket mounted on the rearward end of the rails. During a normal work cycle, the rail contacting surfaces of the sliding brackets experience substantial wear and therefore must be adjusted periodically by the addition of shims or the like to maintain proper clearances.

The above described construction has been used for many years on crawler tractors where the height of the tracks is not critical. However, cranes and hydraulic excavators employ a low profile track assembly to provide a low center of gravity and to permit the upper structure to swing over the track. Consequently, the above described track assembly construction cannot be successfully employed for such use. One of the problems encountered with the use of such low profile track assemblies is that the diameter of the idler has been reduced and the center of the idler located below the top surface of the track roller frame rails. It is not desirable to lower the elevational position of the rails since that would greatly reduce the strength of the roller frame. Some proposals have been made to support the idler with a bearing block slidable within the track roller frame. However, such arrangements require additional and highly complex machining operations to prepare the sliding surface within the frame, adding appreciably to the cost of the vehicle.

The prior art is exemplified by the following U.S. Pat. No. 2,959,451, issued Nov. 8, 1960 to F. Weber; and, No. 2,683,064, issued July 6, 1954 to H.A. Land.

SUMMARY OF THE INVENTION

Accordingly, it is the primary object of this invention to provide an improved mounting assembly for slidably supporting a rotatable member that overcomes the above problems of the prior art.

Another object of this invention is to provide an improved mounting assembly which permits the use of a relatively small diameter rotatable member without any appreciable sacrifice in strength of the support frame.

In accordance with the present invention, there is provided an idler mounting assembly which permits a rugged low profile track to be employed by supporting the ends of the idler support shaft with a pair of brackets disposed between spaced parallel frames with each bracket slidably embracing a pair of external mounting surfaces on each of the frames.

Other objects and advantages of the present invention will become more readily apparent upon reference to the accompanying drawings and following description.

BRIEF DESCRIPTION OF THE DRAWINGS

FIGS. 1 is a side elevational view of a hydraulic excavator having a track assembly embodying the principles of the present invention;

FIG. 2 is a side elevational view, partially in section, of the mounting assembly of FIG. 1;

FIG. 3 is a front elevational view, partially in section, of the mounting assembly of FIG. 2;

FIG. 4 is a top plan view of the mounting assembly of FIG. 2;

FIG. 5 is a fragmentary top plan view of the recoil mechanism of FIG. 2, with portions broken away for illustrative convenience; and, FIG. 6 is a fragmentary cross-sectional view of a modified embodiment of the mounting assembly of the present invention.

DESCRIPTION OF THE PREFERRED EMBODIMENTS

Referring more particularly to the drawings, a mounting assembly embodying the principles of the present invention is indicated generally by the reference numeral 10 and shown incorporated in track support assembly of a hydraulic excavator 11. The excavator includes an upper frame 12 rotatably mounted on a carbody 13 which is supported between and by a pair of track assemblies, one of which is shown at 14. Each of the track assemblies includes an elongated track roller frame 16 which, as will be hereinafter described in greater detail, has the mounting assembly 10 disposed at a forward end 17 thereof for rotatably supporting an idler 18. A powered sprocket 19 is suitably supported at the rearward end 20 of the track roller frame, and an endless track 21 is entrained about the idler and sprocket in the usual manner.

As more clearly shown in FIGS. 3 and 4, the track roller frame 16 includes a pair of spaced parallel rail or box members 22 rigidly interconnected in the usual manner, not shown. Each box member is fabricated from a plurality of elongated plates secured together such as by welding, and has an L-shaped plate 26 at the forward end arranged to form an inwardly opening recess 27. Each box member is provided with a machine finished lower mounting surface 28 to which a plurality of roller assemblies 29, as shown in FIG. 2, are secured, and a machine finished upper mounting surface 31 to which the carbody 13 is secured. A pair of guide surfaces 32 are formed on the inwardly disposed side of the box members at the forward end thereof.

As more clearly shown in FIGS. 2 and 5, each of the track assemblies 14 further includes a recoil mechanism 33 spaced rearwardly from the mounting assembly 10 and disposed substantially between the box members 22. The recoil mechanism has a recoil spring 36 which is retained in a partially compressed condition between a retainer plate 37 abutting against a bulkhead plate 38 secured between the box members, and a hollow adapter 39 which is in abutting engagement with a pair of stop blocks 41 secured to the box members. The adapter 39 has a pair of outwardly extending lugs 42, individually slidably supported on the upper mounting surface 31 of the box members and retained thereon by a pair of retainers 43 secured to the mounting surface.

A hydraulic track adjuster 44 is operatively connected to operate with the recoil mechanism 33 and includes a cylinder 47 reciprocally mounted on a piston 48 disposed within the hollow adapter 39. A chamber 49 is formed between the piston and a forward end 51 of the cylinder. A hollow socket 52 is secured to the forward end of the cylinder and opens toward the idler 18.

As best shown in FIGS. 3 and 4, the mounting assembly 10 of the present invention includes a shaft 54 extending through and rotatably supporting the idler 18 with suitable bearings (not shown) in a conventional manner. The shaft is disposed between the vertically spaced mounting surfaces 28 and 31, and having its ends 56 disposed on opposite sides of the idler and protruding into the recesses 27 at the forward end 17 of the track roller frame 16. A V-shaped notch 57 is provided in each of the ends.

The mounting assembly 10 also includes a pair of mounting brackets 58 disposed between the box members 22 with one bracket on each side of the idler 18. Each bracket has a hub portion 59 protruding into the recess 27. The hub portion has a bore 61 extending therethrough for receiving and supporting engagement with the end 56 of the shaft 54. A passage 63 is formed within each bracket normal to the bore, and cooperates with the V-shaped notch to receive a lock key 64 which secures each bracket to the shaft. A pair of outwardly extending projections 66 and 67 are formed on each bracket and arranged for slidably embracing the respective box member therebetween. The projection 66 has a bearing surface 68 disposed for slidng engagement with the upper mounting surface 31 and the track roller frame, while a bearing surface 69 of the projection 67 is adapted for sliding engagement with the lower mounting surface 28. Each bracket has a pair of guide surfaces 70 individually disposed adjacent to and perpendicular to the guide surfaces 68 and 69 and adapted for sliding engagement with the guide surface 32.

The mounting assembly 10 further includes a forked member 71 having a pair of spaced arms 72 which extend forwardly, and are individually secured to the rear of the support brackets 58 by a plurality of bolts 73. An elongated rod 74 disposed above the shaft 54 has one end connected to the forked member while its other end is loosely disposed within the socket 52 of the track adjuster 44 and in abutting engagement with the forward end 51 of the cylinder 48. The rod is loosely retained with the socket by a setscrew 76.

FIG. 6 shows a modified embodiment of a mounting assembly of the present invention. It is noted that the same reference numbers are used to designate identically constructed counterpart elements of the first embodiment. In this embodiment, however, a replaceable hardened bearing strip 77 is secured to the lower mounting surface 28 of the box member 22 by a plurality of bolts, one of which is shown at 78. The bearing surface 69 of the projection 67 of each bracket 58 is in sliding contact with the replaceable bearing strip. This construction permits replacement of the worn bearing surfaces without replacing the entire rail assembly.

OPERATION

While the operation of the present invention is believed clearly apparent from the foregoing description, further amplification will subsequently be made in the following brief summary of such operation. When the track 21 hits an obstruction or an object becomes lodged between the track and the idler and/or sprocket, the idler and mounting assembly are forced rearwardly with the bearing surfaces 68 and 69 sliding on the bearing surfaces 31 and 28 respectively. The complementary guide surfaces 32 and 70 of the box members and brackets, respectively, maintain the idler in a proper alignment between the box members. The rod 74 of the mounting device is in abutting engagement with the recoil mechanism 33, and the rearward movement of the idler and the mounting assembly compresses the recoil spring 36. When the object is dislodged from the track, expansion of the compressed recoil spring forces the mounting assembly and idler forwardly to their original position.

In view of the foregoing, it is readily apparent that the structure of the present invention provides an improved mounting assembly for slidably mounting an idler to the forward end of a track roller frame. The projections of the mounting brackets slidably embrace the box members of the frame and utilize the machined bearing surfaces provided thereon. The mounting brackets mount the shaft elevationally between the mounting surfaces, thus permitting a smaller diameter idler and a larger frame to be used, thus not sacrificing the strength of the frame. The smaller idler thereby allows the profile of the track to be lowered substantially. Positioning the shaft between the projections of the mounting bracket reduces the tendency of the mounting brackets to bind upon the sliding bearing surfaces during sliding movement of the mounting assembly. Due to the location of the rod of the mounting assembly relative to the idler support shaft, it is subjected to bending loads during the recoil action of the idler. The loose fitting couple between the rod and the recoil mechanism is provided to permit such bending loads to occur without concentrating the stresses in one area such as would occur if the rod were fixed rigidly to the recoil mechanism.

While the invention has been described and shown with particular reference to the preferred embodiments, it will be apparent that variations might be possible that would fall within the scope of the present invention, which is not intended to be limited except as defined in the following claims.

What is claimed is:

1. A mounting assembly for movably supporting a rotatable member, said assembly comprising:
   a pair of spaced substantially parallel frames, each of said frames having a pair of vertically spaced substantially parallel planer bearing surfaces, said bearing surfaces defining the upper and lower limits of said frames;
   axle means for rotatably supporting a rotatable member; and
   bracket means slidably embracing said bearing surfaces to mount said axle means between said frames intermediate said bearing surfaces.

2. The mounting assembly of claim 1 wherein said axle means is an elongated shaft having opposite ends extending outwordly from said rotatable member for connection to said bracket means.

3. The mounting assembly of claim 2 wherein each of said frames has an inwardly opening recess formed between said bearing surfaces with said ends of said shaft extending into said recesses.

4. The mounting assembly of claim 3 comprising a recoil mechanism secured to said frames in spaced relation to said mounting assembly and having a socket opening toward said rotatable member;

a forked member secured to said bracket means; and, a rod secured at one end to said forked member and the other end loosely retained within said socket.

5. The invention of claim 3 wherein said rotatable member is a track idler, and said frame is a track frame.

6. A mounting assembly for slidably supporting an idler on a track frame, said assembly comprising:

a pair of horizontally extending transversely spaced substantially parallel rail members, each rail member having a pair of vertically spaced substantially parallel bearing surfaces, defining the upper and lower limits of the rail member;

a shaft disposed between said rail members;

an idler rotatably mounted on said shaft intermediate the ends thereof; and, a pair of support brackets individually supporting the ends of said shaft and disposed between said rail members, each of said support brackets having a pair of outwardly extending projections arranged for slidably embracing said bearing surfaces of said rail members.

7. The mounting assembly of claim 6 wherein each of said rail members has an inwardly opening recess formed between said mounting surfaces with said ends of said shaft protruding into said recesses.

8. The mounting assembly of claim 7 comprising a recoil mechanism mounted on said frame in spaced relation to said mounting assembly and including a socket opening toward said idler;

a forked member secured to said brackets; and, a rod having one end secured to said forked member and the other end loosely retained within said socket.

9. The mounting device of claim 7 wherein each of said rail members has a guide surface formed thereon substantially normal to said bearing surfaces and each of said brackets has a guide surface formed thereon and adapted for slidable engagement with said guide surface of said rail member to maintain said idler in longitudinal alignment with said rail members.

* * * * *